(12) United States Patent
Ogawa

(10) Patent No.: US 8,109,636 B2
(45) Date of Patent: Feb. 7, 2012

(54) ILLUMINATION OPTICAL SYSTEM AND PROJECTION TYPE DISPLAY APPARATUS WITH A SHIELD BOARD

(75) Inventor: Jun Ogawa, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 919 days.

(21) Appl. No.: 11/806,004

(22) Filed: May 29, 2007

(65) Prior Publication Data
US 2007/0296930 A1    Dec. 27, 2007

(30) Foreign Application Priority Data

Jun. 21, 2006    (JP) .................................. 2006-171253

(51) Int. Cl.
*G03B 21/14* (2006.01)

(52) U.S. Cl. ................. 353/20; 353/84; 353/97; 353/98; 353/122

(58) Field of Classification Search ............... 353/20, 353/84, 97, 98, 122; 359/495, 497; 348/742, 348/743, 771
See application file for complete search history.

(56) References Cited

U.S. PATENT DOCUMENTS

| | | | |
|---|---|---|---|
| 5,865,521 A | 2/1999 | Hashizume et al. | |
| 6,698,891 B2 * | 3/2004 | Kato | 353/20 |
| 7,163,299 B2 * | 1/2007 | Lee | 353/99 |
| 2005/0012913 A1 | 1/2005 | Verweij et al. | |
| 2005/0052873 A1 | 3/2005 | Sokolov | |
| 2005/0128605 A1 | 6/2005 | Cole et al. | |
| 2006/0044527 A1 | 3/2006 | Watanabe et al. | |

FOREIGN PATENT DOCUMENTS

| | | |
|---|---|---|
| CN | 1175707 A | 3/1998 |
| EP | 1 482 363 A1 | 1/2004 |
| EP | 1 553 786 A1 | 7/2005 |
| JP | 10-115799 | 5/1998 |
| JP | 2002-250894 | 9/2002 |
| JP | 2003-91045 | 3/2003 |
| JP | 2004-45718 | 2/2004 |
| JP | 2004-258439 A | 9/2004 |
| JP | 2004-279843 A | 10/2004 |
| JP | 2005-70271 | 3/2005 |
| JP | 2006-065202 A | 3/2006 |
| JP | 2006-133641 A | 5/2006 |

OTHER PUBLICATIONS

Chinese Office Action dated Nov. 6, 2009 with English-language translation.
European Search Report dated Dec. 21, 2009.

(Continued)

*Primary Examiner* — Tony Ko
(74) *Attorney, Agent, or Firm* — McGinn Intellectual Property Law Group, PLLC

(57) ABSTRACT

The invention provides an illumination optical system that guides light emitted from light source device 1 to DMD 2, the illumination optical system including: light tunnel 20 that uniformizes luminance distribution of light emitted from light source device 1; relay optical system 40 that guides light having uniformized illumination distribution to DMD 2; and shield board 30 disposed on an optical path between light tunnel 20 and relay optical system 40. Shield board 30 is smaller than outlet end face 22 of light tunnel 20 and at the same time has an opening of a shape similar to the image formation area on DMD 2, and is movable in a plane containing the opening.

20 Claims, 6 Drawing Sheets

OTHER PUBLICATIONS

Chinese Office Action dated May 22, 2009 with English-language translation.
Chinese Office Action dated Mar. 30, 2010 with an English-language translation.
Japanese Office Action dated Sep. 29, 2011, with partial English translation.

* cited by examiner

ILLUMINATION OPTICAL SYSTEM AND PROJECTION TYPE DISPLAY APPARATUS WITH A SHIELD BOARD

This application is based upon and claims the benefit of priority from Japanese Patent Application No. 2006-171253 filed on Jun. 21, 2006, the content of which is incorporated by reference.

BACKGROUND OF THE INVENTION

1. Field of the Invention

The present invention relates to a projection type display apparatus, and more particularly to an illumination optical system that guides light emitted from a light source to an image forming device.

2. Description of the Related Art

In a projection type display apparatus that magnifies and projects image light (picture image) formed by an image forming device such as a liquid crystal panel or DMD (Digital Micro-mirror Device), light emitted from a light source is guided to the image forming device by an illumination optical system. A typical illumination optical system has an integrator that uniformizes luminance distribution of light emitted from the light source, and a relay optical system guiding light outputted from the integrator to the image forming device. Further, between the light source and integrator, there is arranged a color separation unit such as a color wheel, if necessary.

In general, the integrator is roughly classified into "rod type integrator" and "array type integrator". In the rod type integrator, light entering from one end is propagated to the other end while being reflected several times in the interior thereof, whereby the luminance distribution is uniformized. The rod type integrator is further classified into hollow column-shaped "light tunnel" and solid column-shaped "rod integrator". On the other hand, in the array type integrator, light flux is separated and combined by a lens array having a plurality of lenses arranged in a matrix shape, whereby the luminance distribution is uniformized. In this specification, unless particularly specified, the rod type integrator (light tunnel or rod integrator) and array type integrator are referred to collectively as an "integrator".

Here, in order to prevent lowering of image brightness, occurrence of shadow in an image, or the like, the image formation area (effective area) of the image forming device must accurately coincide with the irradiation area (illumination area) of illumination light in the image forming device. However, even when at the design stage, the effective area accurately coincide with the illumination area, the areas may not coincide in the actual fabrication. The chief cause for the difference is variations between constituent elements. For example, when there are variations of size, shape, optical characteristics or the like between optical elements constituting the integrator or relay optical system, even if these are arranged according to the design values, a difference between the effective area and illumination area occurs. Also, even when there is no variation of size or the like of the integrator or optical element, if positioning accuracy is low when these are arranged, a difference between the effective area and illumination area also occurs. Consequently, in fabricating the illumination optical system, position adjustment (fine adjustment) between the effective area and illumination area must be made as required.

As a method of making position adjustment between the effective area and the illumination area, there is a method in which the outlet end of the integrator is displaced. As another method thereof, there is a method in which a mirror disposed in an optical path of illumination light between the integrator and the image forming device is displaced.

Also, when a reflection type image forming device such as DMD is used, since illumination light must enter the image forming device from an oblique direction, the illumination area is distorted to a substantially trapezoidal shape. This is a phenomenon similar to a case where, when an image is projected on a screen from an oblique direction, the projected image is distorted to a substantially trapezoidal shape. Thus, Japanese Patent Laid-Open No. 2004-45718 has disclosed a technique for correcting the trapezoidal distortion (keystone distortion) by use of an optical system disposed between the integrator and image forming device.

Japanese Patent Laid-Open No. 2005-70271 has disclosed a technique for arranging on the outlet end face of a rod integrator an opening member that includes a reflection area around the opening area and for changing the opening member according to the size of image forming device to thereby adjust the size of illumination area.

The above method of making a position adjustment between the effective area of an image forming device and the illumination area of illumination light in the image forming device involves the following problem. First, when the outlet end of the integrator is displaced, the input end of the integrator is also displaced simultaneously; and thus there occurs a difference between the optical axis of light incident on integrator and the optical axis of the integrator. When the difference between the optical axis of incident light and the optical axis of integrator occurs, projected image luminance irregularity occurs.

Also, when the mirror disposed in the optical path of illumination light is displaced, unless the mirror is made to rotate around the light flux irradiated on the mirror, the optical path length of illumination light varies; when the optical path length of illumination light varies, the convergence point of illumination light moves forward of, or backward of the surface of image forming device, and thus the peripheral part of the projected image is darkened.

Further, according to the technique disclosed by Japanese Patent Laid-Open No. 2005-70271, while the size of illumination area can be varied, position adjustment between the effective area and illumination area cannot be made.

SUMMARY OF THE INVENTION

An object of the present invention is to implement an illumination optical system capable of making with a simple structure, position adjustment between the effective area and illumination area. Another object of the present invention is to implement a projection type display apparatus provided with the illumination optical system.

The illumination optical system of the present invention is one that guides light emitted from a light source to an image forming device. The illumination optical system of the present invention includes: a rod type integrator that uniformizes luminance distribution of light emitted from the light source; a relay optical system that guides light having the illumination distribution uniformized by the rod type integrator to the image forming device; and a shield board disposed on an optical path between the rod type integrator and the relay optical system. The shield board has an opening which is smaller than the outlet end face of the rod type integrator and has similar shape to the image formation area on the image forming device, and is movable in a plane containing the opening.

The projection type display apparatus of the present invention includes; a light source; an image forming device that modulates light emitted from the light source based on an image signal; and a projection optical system that magnifies and projects the light modulated by the image forming device. On an optical path between the light source and the image forming device, there is arranged an illumination optical system. The illumination optical system has: a rod type integrator that uniformizes the luminance distribution of light emitted from the light source; a relay optical system that guides light that includes the illumination distribution uniformized by the rod type integrator to the image forming device; and a shield board disposed between the rod type integrator and the relay optical system. The shield board has an opening which is smaller than the outlet end face of the rod type integrator and has similar shape to the image formation area on the image forming device, and is movable in a plane containing the opening.

Preferably, the shield board is rotatable around the center of the opening.

Preferably, the shield board is rotatable around a first axis passing through the center of the opening and at the same time being orthogonal to a plane contacting the opening.

Preferably, the shield board is rotatable around a second axis passing through the center of the opening and at the same time being parallel to a plane contacting the opening.

Preferably, the shield board can move back and forth along a propagation direction of light passing through the opening.

The above and other objects, features and advantage of the present invention will become apparent from the following description with reference to the accompanying drawings which illustrate examples of the present invention.

DETAILED DESCRIPTION OF THE PREFERRED EMBODIMENTS

Figure 1:
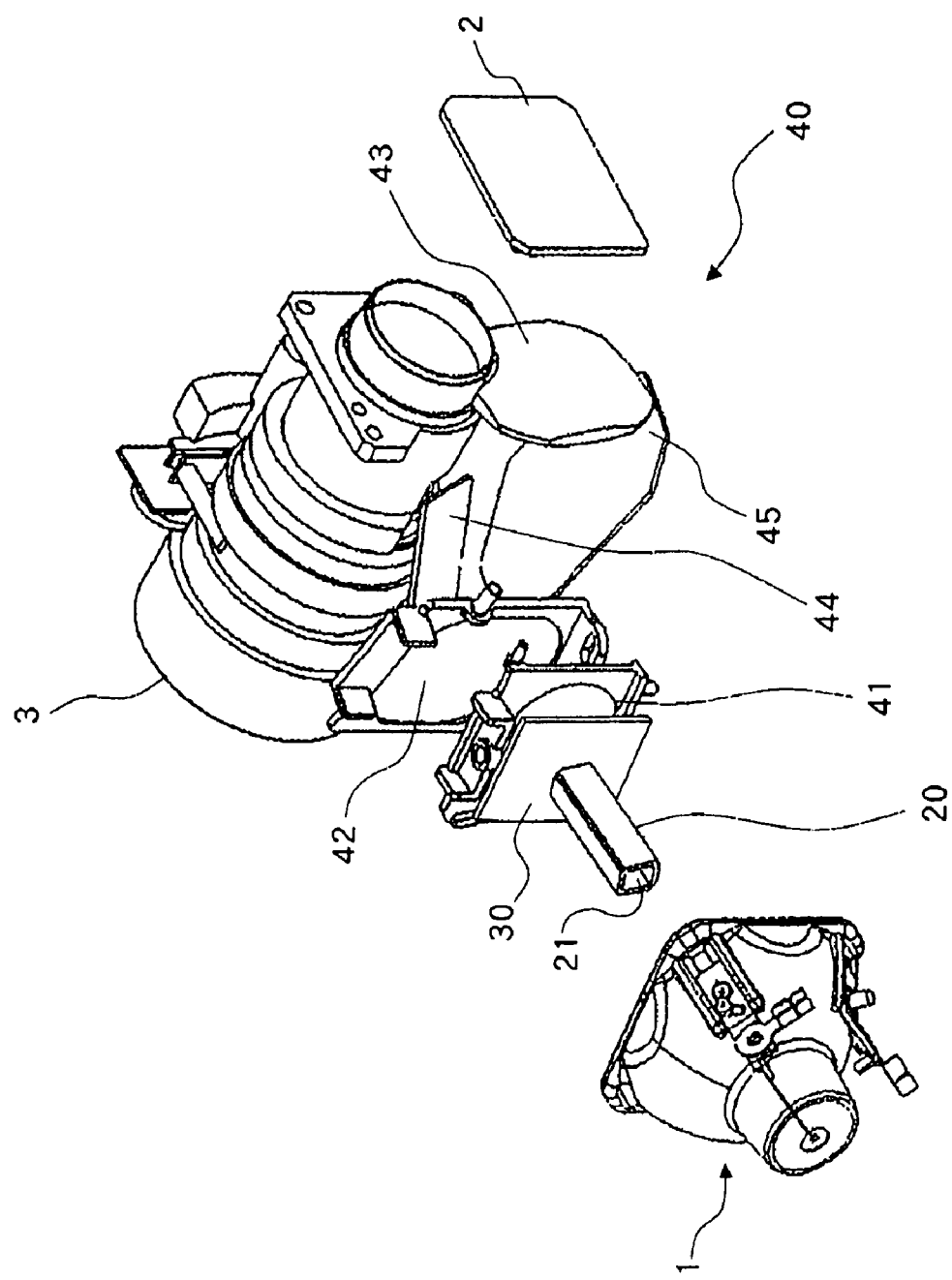
FIG. 1 is a perspective view illustrating an example of an embodiment of an illumination optical system of the present invention.
Figure 2:
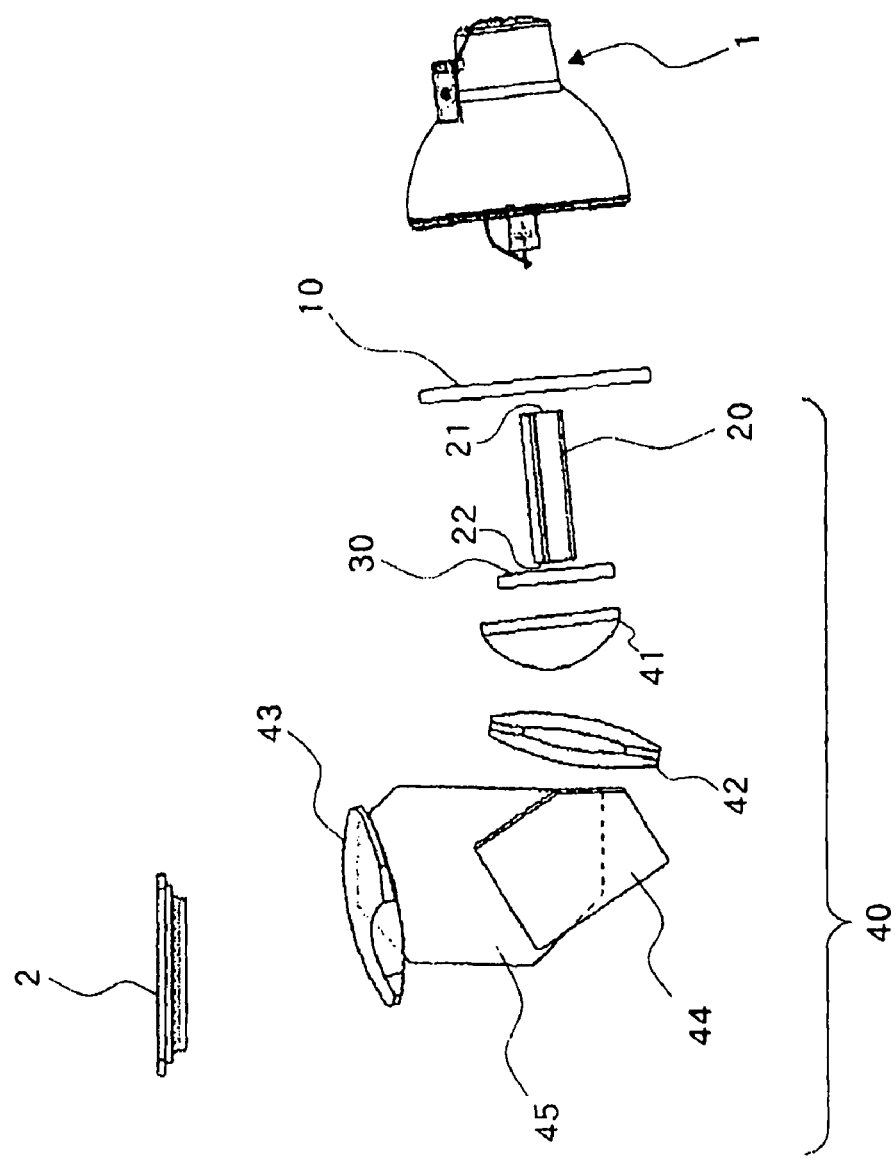
FIG. 2 is a schematic side view illustrating the positional relationship between constituent elements of the illumination optical system of FIG. 1.

An example of an embodiment of an illumination optical system according to the present invention will now be described in detail with reference to the drawings. FIG. 1 is a perspective view illustrating the structure of the illumination optical system of the present invention. FIG. 2 is a schematic side view illustrating the arrangement of constituent members of the illumination optical system of FIG. 1.

As illustrated in FIG. 1, the illumination optical system of the present invention serves to guide light (illumination light) emitted from light source 1 to an image forming device (DMD 2). DMD 2 modulates light guided by the illumination optical system based on an image signal and thereby forms modulated light flux. The light flux modulated by DMD 2 is magnified and projected via projection lens 3 on a screen (not illustrated). The structure of DMD 2 and the principle of light modulation by DMD 2 are known, and hence explanation thereof is omitted here. The illumination optical system that is a feature of the present invention will be described in detail below.

As illustrated in FIGS. 1 and 2, the illumination optical system of this embodiment comprises of: color wheel 10 disposed between light source device 1 and DMD2; an integrator (light tunnel 20); shield board 30; and relay optical system 40. These constituent elements of the illumination optical system are incorporated and integrated in a unit base (not shown) together with light source device 1, DMD 2 and projection lens 3, comprising an optical engine. To show inlet end face 21 of light tunnel 20, an illustration of color wheel 10 is omitted in FIG. 1.

Color wheel 10 includes a plurality of color segments. Color wheel 10 time-divides light (white light) emitted from light source device 1 into colored light of at least three colors, R (red), G (green) and B (blue). Light source device 1 includes a reflector that converges light emitted from a light source such as an extra high pressure mercury lamp, metal halide lamp or xenon lamp and thereby forms a virtual secondary light source. Color wheel 10 is placed so that the color segments are disposed at the position (focal point) or in the vicinity where the secondary light source is formed.

Light tunnel 20 is arranged so that the light (colored light) passing through color wheel 10 is incident thereon via inlet end face 21. The light incident on light tunnel 20 via inlet end face 21 propagates toward outlet end face 22 while repeatedly being reflected in this light tunnel 20. Luminance irregularity of the light propagating in light tunnel 20 is reduced (luminance distribution being uniformized) during the propagation in light tunnel 20. Here, at least outlet end face 22 of light tunnel 20 preferably has a shape similar to the effective area of DMD 2. Inlet end face 21 and outlet end face 22 of light tunnel 20 according to the present embodiment have a shape similar to the effective area of DMD 2. Also, light tunnel 20 has a cross-sectional shape (rectangular shape) similar to the effective area of DMD 2 over the whole length thereof.

Figure 3:
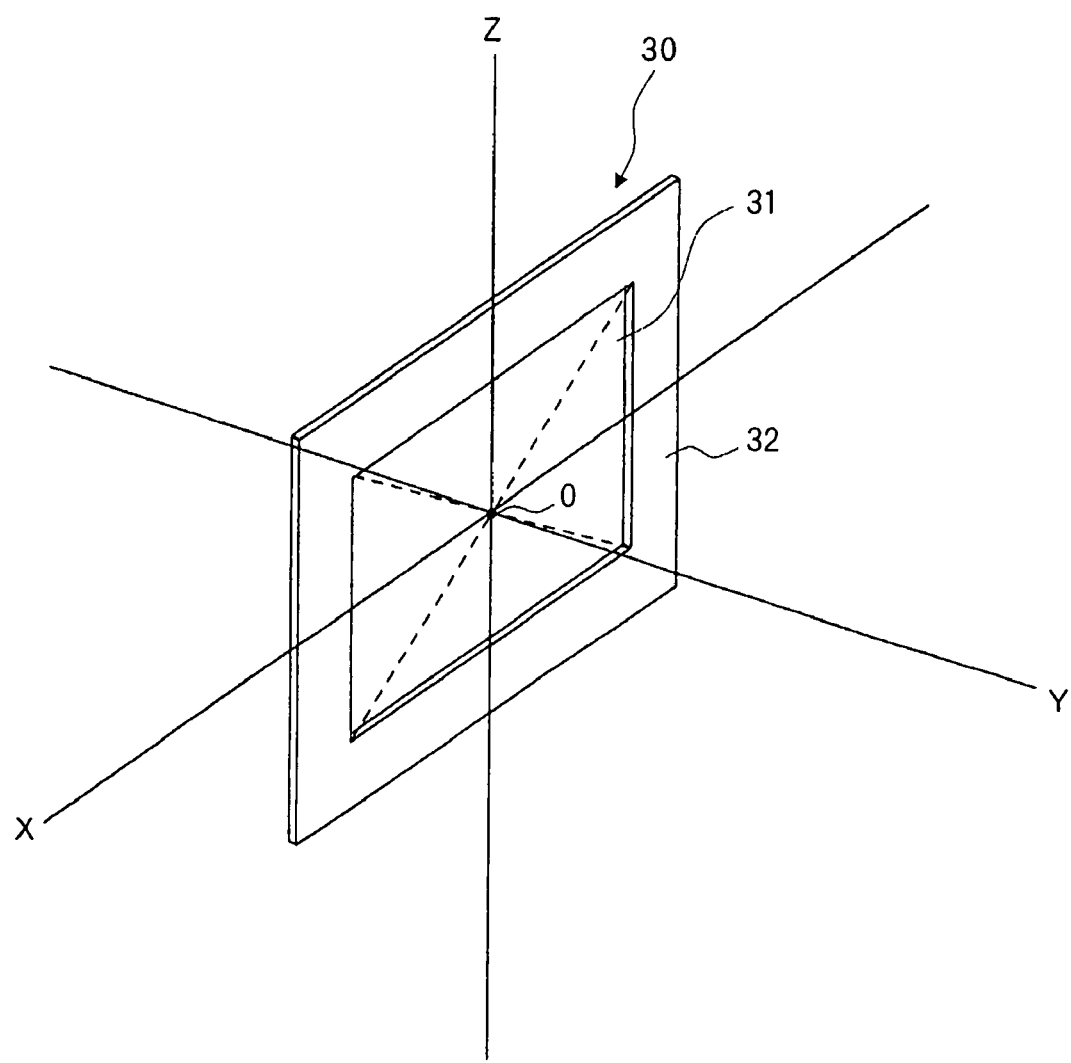
FIG. 3 is a schematic enlarged view of a shield board.

As illustrated in FIG. 3, shield board 30 is a board comprising: opening 31 smaller than outlet end face 22 of light tunnel 20 and at the same time having a shape similar to the effective area of DMD 2; and light shield 32 extending to the outer side of opening 31. This shield board 30 is disposed between outlet end face 22 of light tunnel 20 and relay optical system 40 (first lens 41) as shown in FIG. 2. Accordingly, of the light outputted from outlet end face 22 of light tunnel 20, light incident on opening 31 passes therethrough and enters relay optical system 40, while light outside opening 31 is shielded by light shield 32 and thus does not reach relay optical system 40. That is, the cross-sectional shape (cross-sectional shape of light flux) of light incident on relay optical system 40 is defined by the shape of opening 31. Further, this shield board 30 is held so that can be moved to a predetermined direction.

Here, in order to explain the movement direction of shield board 30, space coordinates are defined as shown in FIG. 3, the center of opening 31 being origin O. More specifically, an axis passing through origin O and orthogonal to a plane containing opening 31 is defined as Y-axis; two axes, orthogonal to Y-axis in the plane containing opening 31 and at the same time orthogonal to each other are defined as X-axis and Z-axis. In the space coordinates defined as described above, shield board 30 can move in parallel to Z-axis (vertical movement). Also, shield board 30 can move in parallel to X-axis (horizontal movement). In other words, shield board 30 can move vertically and horizontally in the plane (XZ plane) containing opening 31.

Figure 4:
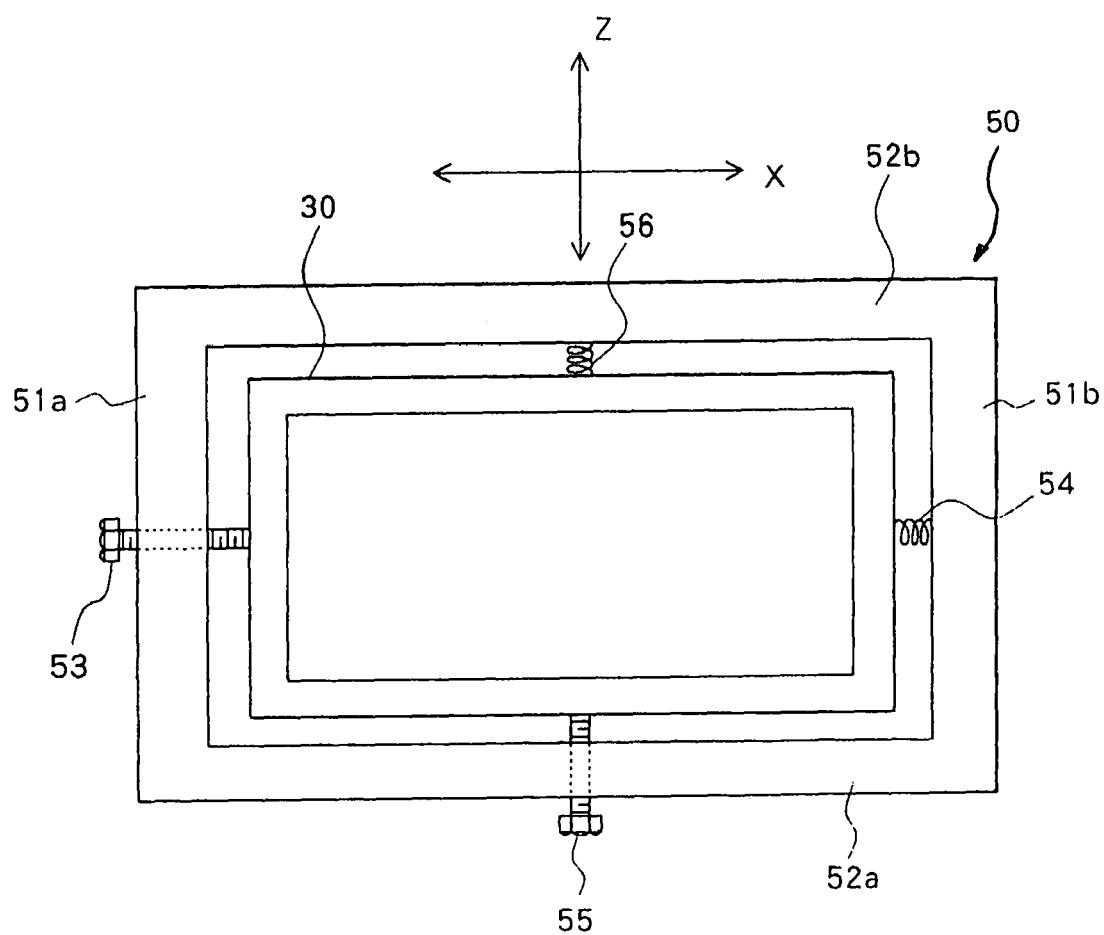
FIG. 4 is a schematic plan view illustrating an exemplary mechanism for holding the shield board.

The mechanism for holding shield board 30 movable in the above described directions is not particularly limited, but an exemplary movement mechanism is illustrated in FIG. 4. As illustrated in FIG. 4, shield board 30 is arranged in the inner side of frame-shaped holder 50 comprising a pair of short-side parts 51a and 51b facing each other and a pair of long-side parts 52a and 52b facing each other. On the outer side face of shield board 30 facing the inner side face of short-side part 51a, there protrudes a tip end face of screw 53 extending through short-side part 51a. A coil spring 54 is arranged between the inner side face of short-side part 51b and the outer side face of shield board 30 facing this inner side face. Also, on the outer side face of shield board 30 facing the inner side face of long-side part 52a, there protrudes a tip end face of screw 55 extending through long-side part 52a. Also, a coil spring 56 is arranged between the inner side face of long-side part 52b and the outer side face of shield board 30 facing this inner side face. Consequently, shield board 30 is biased toward short-side part 51a and long-side part 52a at all times, and can be made to move vertically and horizontally by making screws 53 and 55 move back and forth, and at the same time can be made to be fixed at a position after the movement of the screws.

Frame-shaped holder 50 can also be provided with guiding means, such as a guide pin or guide rail, for guiding shield board 30 when shield board 30 moves as described above. Also, in order to prevent coil springs 54 and 56 from dropping off or being dislocated, protrusions arranged in either one of the inner side face of a short-side part 51b and long-side part 52b or the outer side face of shield board 30, or in both one of the inner side face of a short-side part 51b and long-side part 52b, and the outer side face of shield board 30, may be inserted into the inner side of coil springs 54 and 56. In this case, when coil springs 54 and 56 contract in association with movement of shield board 30, if the outer side face of shield board 30 interferes too early with the protrusion tip end, a sufficient amount of movement cannot be ensured. It is thus preferable that the total length of coil springs 54 and 56 and the protrusions, and the spring rate of coil springs 54 and 56 be defined to prevent the movement amount of shield board 30 from being limited to a desired value or less.

It is noted, for the sake of convenience of drawing, that there is difference between the area ratio of opening 31 to light shield 32 in shield board 30 shown in FIGS. 3, 4 and to the area ratio shown in FIGS. 1 and 2. As described above, opening 31 is smaller than outlet end face 22 of light tunnel 20, and light shield 32 has a size that is necessary for and sufficient to shielding light outside opening 31.

Referring again to FIGS. 1 and 2, relay optical system 40 will be described. Relay optical system 40 comprises first lens 41, second lens 42, third lens 43, first reflecting mirror 44 and second reflecting mirror 45. Relay optical system 40 uses shield board 30 as the object face, and DMD 2 as the imaging surface. Accordingly, when light passing through opening 31 of shield board 30 is irradiated on DMD 2, this is equivalent to that opening 31 of shield board 30 is magnified and projected on DMD 2. That is, the shape of illumination area on DMD 2 is similar to the shape of opening 31.

First reflecting mirror 44 and second reflecting mirror 45 included in relay optical system 40 are both flat mirrors arranged to fold back the optical path and thereby downsize the entire illumination optical system. Therefore, omitting first reflecting mirror 44 and second reflecting mirror 45 does not cause the above optical characteristics to vary.

In the illumination optical system of the present embodiment having the above described structure, when shield board 30 is made to move vertically and horizontally, position adjustment between the effective area and the illumination area on DMD 2 can be made. More specifically, when there occurs a difference between the effective area and illumination area which are supposed to accurately coincide with each other in design, and thus part of the effective area is not irradiated at all or not sufficiently irradiated, then screws 53 and 55 illustrated in FIG. 4 are made to move back and forth to make shield board 30 move vertically and horizontally. As a result, the position of illumination area on DMD 2 moves, and coincides with the effective area.

Figure 5A:
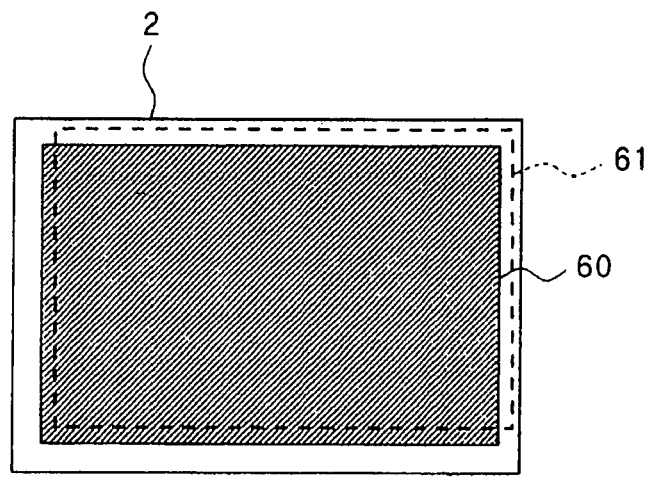
FIGS. 5A to 5C are schematic views illustrating different configurations of differences between the effective area and the illumination area.
Figure 5B:
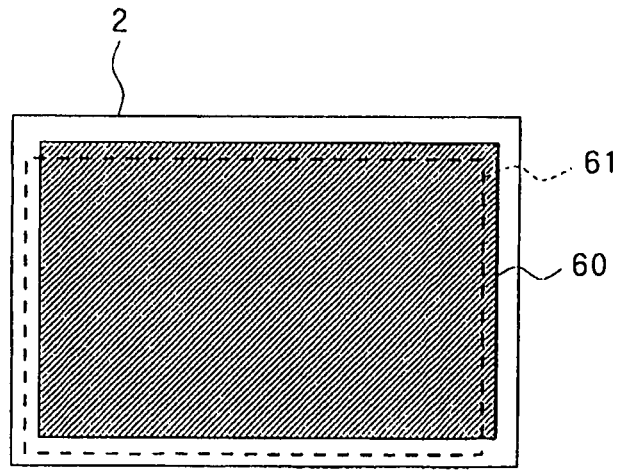
Figure 5C:
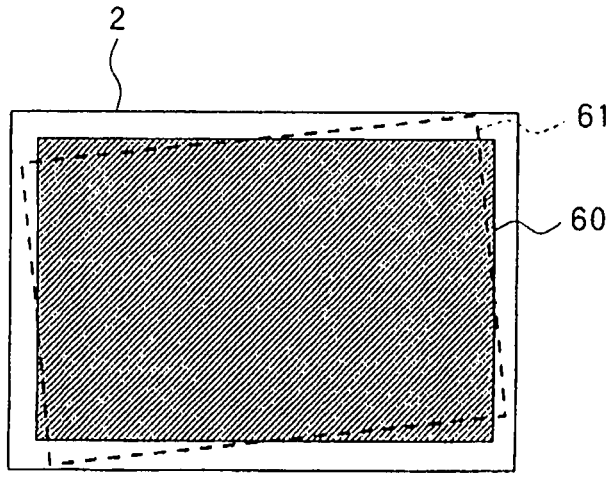

The case where shield board 30 can move in parallel in four directions (vertically and horizontally) has been described up to now. However, the movement direction of shield board 30 is not limited thereto; movement in a direction different from the above described direction is also possible, or another movement direction can be added. For example, shield board 30 can also be made to move in an oblique direction in the XZ plane illustrated in FIG. 3. If shield board 30 can move in an oblique direction, when there is, also as illustrated in FIGS. 5A and 5B, a difference in a diagonal direction between effective area 60 and illumination area 61, the difference can be corrected so that the two areas coincide with each other.

Figure 6:
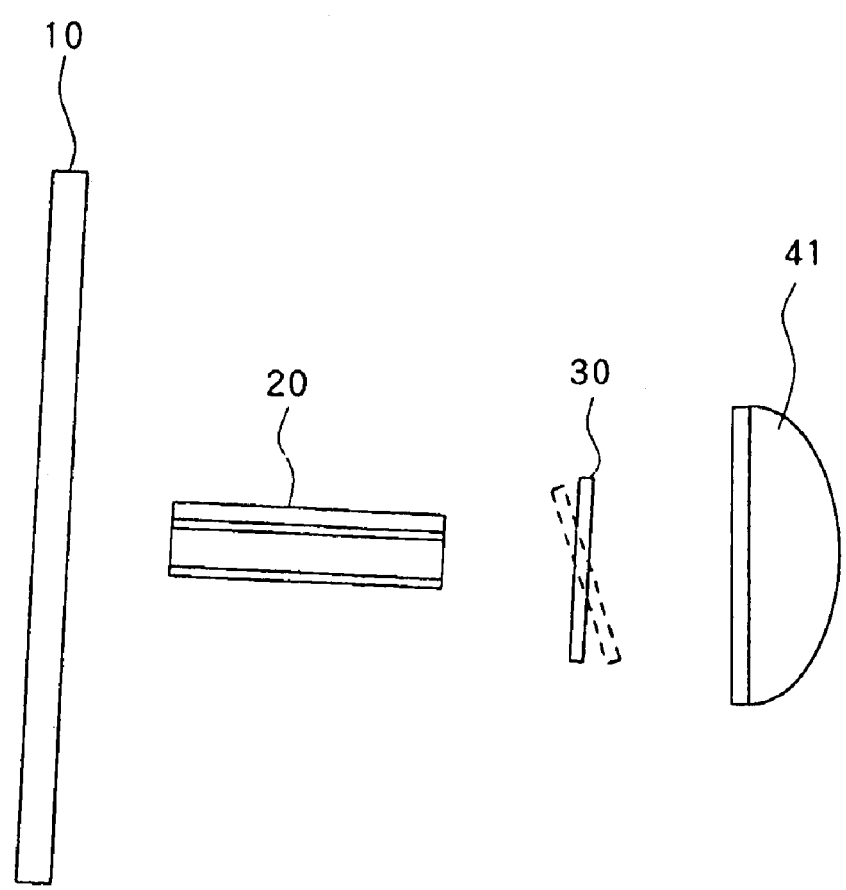
FIG. 6 is a schematic side view illustrating a state where the shield board is made to rotate around the X-axis of FIG. 3.

Also, if shield board 30 can rotate around Y-axis of FIG. 3, when effective area 60 and illumination area 61 do not coincide with each other with respect to the normal line of DMD 2, also, the difference can be corrected so that the two areas coincide with each other. Also, as illustrated in FIG. 6, if shield board 30 can rotate around the X-axis of FIG. 3, trapezoidal distortion of illumination area caused when DMD 2 is irradiated with light from an oblique direction, can also be corrected.

Also, if shield board 30 can move back and forth along the Y-axis of FIG. 3, focus adjustment is also possible. The optical system 40 should be designed so that the shield board 30 is as the object face and DMD 2 is as the imaging surface. However, when the above conjugate relationship is not satisfied for some reason, focusing can be achieved by making shield board 30 moves back and forth along the Y-axis. Further, instead of using a specific axis as the rotation axis, rotation in any direction around origin O illustrated in FIG. 3 is also possible.

When shield board 30 is made to move in an oblique direction, or rotate around the Y-axis, or rotate around the X-axis, or rotate or move in another direction, then frame-shaped holder 50 shown in FIG. 4 is further held by a second holder, and shield board 30 is made to move or rotate together with frame-shaped holder 50. It is noted that the holding mechanism for shield board 30 allowing the above movement or rotation is not limited to a particular mechanism.

As described above, according to the present invention, position adjustment between the effective area and illumination area on the image forming device can be made solely by moving the shield board. Further, the increase in the number of movements or rotation directions of the shield board not only increase the variation of position adjustment of the illumination area on the image forming device, but can also implement focus adjustment and distortion correction. Such operation and effect of the present invention is similar both in a light tunnel integrator and in a rod integrator. Accordingly, light tunnel 20 illustrated in FIG. 1 and other drawings can be replaced with a rod integrator. Also, the image forming device may not be a reflection type image forming device, but may be a transmission type image forming device such as a liquid crystal panel.

When an optical engine and other constituent elements, including the illumination optical system explained in the above embodiment, are received in an exterior case, a projection type display apparatus of the present invention can be implemented. The constituent elements received in the exterior case together with the optical engine can be selectively removed as required. Typically, a power source unit, various types of input and output boards, control board, loudspeaker, cooling fan and the like are received as minimum necessary constituent elements in the exterior case.

While preferred embodiments of the present invention have been described using specific terms, such description is for illustrative purposes only, and it is to be understood that changes and variations may be made without departing from the spirit or scope of the following claims.

What is claimed is:

1. An illumination optical system that guides light emitted from a light source to an image forming device, the illumination optical system comprising:
    a rod type integrator that uniformizes luminance distribution of light emitted from the light source;
    a relay optical system that guides light having the illumination distribution uniformized by the rod type integrator to the image forming device; and
    a shield board disposed on an optical path between the rod type integrator and the relay optical system,
        wherein the shield board has an opening which is smaller than the outlet end face of the rod type integrator and has similar shape to an image formation area on the image forming device, and is movable in a plane containing the opening,
        wherein the shield board and the image forming device have a conjugate relation, and the shield board acts as an object face and the image forming device acts as an imaging surface in the conjugate relation, and
        wherein an image of an opening of the shield board is projected on the image forming device at a similar magnification.

2. An illumination optical system according to claim 1, wherein the shield board is rotatable around a first axis passing through the center of the opening and at the same time being orthogonal to the plane.

3. An illumination optical system according to claim 1, wherein the shield board is rotatable around a second axis passing through the center of the opening and at the same time being parallel to the plane.

4. An illumination optical system according to claim 1, wherein the shield board can move back and forth along a propagation direction of light passing through the opening.

5. The illumination optical system of claim 1, wherein a surface of the shield board is perpendicular to a surface of the image forming device.

6. The illumination optical system of claim 1, wherein a surface of the shield board is normal to a surface of the image forming device.

7. The illumination optical system of claim 1, wherein the shield board is located on a first plane that is perpendicular a second plane where the image forming device is located.

8. The illumination optical system of claim 1, wherein the shield board is movable along a first axis, a second axis perpendicular to the first axis, and a third axis perpendicular to the first axis and the second axis, relative to the rod type integrator.

9. The illumination optical system of claim 8, wherein the relay optical system comprises a plurality of reflecting mirrors located between the shield board and the image forming device.

10. An illumination optical system that guides light emitted from a light source to an image forming device, the illumination optical system comprising:
    a rod type integrator that uniformizes luminance distribution of light emitted from the light source;
    a relay optical system that guides light having the illumination distribution uniformized by the rod type integrator to the image forming device; and
    a shield board disposed on an optical path between the rod type integrator and the relay optical system,
        wherein the shield board has an opening which is smaller than the outlet end face of the rod type integrator and has similar shape to an image formation area on the image forming device, and is movable in a plane containing the opening,
        wherein the shield board is rotatable around the center of the opening,
        wherein the shield board and the image forming device have a conjugate relation, and the shield board acts as an object face and the image forming device acts as an imaging surface in the conjugate relation, and
        wherein an image of an opening of the shield board is projected on the image forming device at a similar magnification.

11. An illumination optical system according to claim 10, wherein the shield board is rotatable around a first axis passing through the center of the opening and at the same time being orthogonal to the plane.

12. An illumination optical system according to claim 10, wherein the shield board is rotatable around a second axis passing through the center of the opening and at the same time being parallel to the plane.

13. An illumination optical system according to claim 10, wherein the shield board can move back and forth along a propagation direction of light passing through the opening.

14. An illumination optical system that guides light emitted from a light source to an image forming device, the illumination optical system comprising:
    a rod type integrator that uniformizes luminance distribution of light emitted from the light source;
    a relay optical system that guides light having the illumination distribution uniformized by the rod type integrator to the image forming device; and
    a shield board disposed on an optical path between the rod type integrator and the relay optical system,
    wherein the shield board has an opening which is smaller than the outlet end face of the rod type integrator and has similar shape to an image formation area on the image forming device, and is movable in a plane containing the opening, and
    wherein the shield board is rotatable around the center of the opening, and
    wherein the shield board is rotatable around a first axis passing through the center of the opening and at the same time being orthogonal to the plane,
    wherein the shield board is rotatable around a second axis passing through the center of the opening and at the same time being parallel to the plane,
    wherein the shield board and the image forming device have a conjugate relation, and the shield board acts as an object face and the image forming device acts as an imaging surface in the conjugate relation, and
    wherein an image of an opening of the shield board is projected on the image forming device at a similar magnification.

15. An illumination optical system according to claim 14, wherein the shield board can move back and forth along a propagation direction of light passing through the opening.

16. A projection type display apparatus having:
a light source;
an image forming device that modulates light emitted from the light source based on an image signal; and
a projection optical system that magnifies and projects the light modulated by the image forming device, the projection type display apparatus comprising:
an illumination optical system, arranged on an optical path between the light source and the image forming device, including: a rod type integrator that uniformizes luminance distribution of light emitted from the light source; a relay optical system that guides light having the illumination distribution uniformized by the rod type integrator to the image forming device; and a shield board disposed between the rod type integrator and the relay optical system,
wherein the shield board has an opening which is smaller than the outlet end face of the rod type integrator and has similar shape to an image formation area on the image forming device, and is movable in a plane containing the opening,
wherein the shield board and the image forming device have a conjugate relation, and the shield board acts as an object face and the image forming device acts as an imaging surface in the conjugate relation, and
wherein an image of an opening of the shield board is projected on the image forming device at a similar magnification.

17. A projection type display apparatus according to claim 16, wherein the shield board is rotatable around the center of the opening.

18. A projection type display apparatus according to claim 16, wherein the shield board is rotatable around a first axis passing through the center of the opening and at the same time being orthogonal to the plane.

19. A projection type display apparatus according to claim 16, wherein the shield board is rotatable around a second axis passing through the center of the opening and at the same time being parallel to the plane.

20. A projection type display apparatus according to claim 16, wherein the shield board can move back and forth along a propagation direction of light passing through the opening.

* * * * *